(12) United States Patent
Houis et al.

(10) Patent No.: US 10,830,283 B2
(45) Date of Patent: Nov. 10, 2020

(54) DUST BOOT FOR TRANSMISSION JOINT AND CORRESPONDING TRANSMISSION ASSEMBLY

(71) Applicant: TRELLEBORG BOOTS FRANCE, Carquefou (FR)

(72) Inventors: Jacques Houis, Thouare sur Loire (FR); Frédéric Maitay, Rialle (FR); Jean-Luc Bouhour, La Haye Fouassiere (FR)

(73) Assignee: TRELLEBORG BOOTS FRANCE, Carquefou (FR)

( * ) Notice: Subject to any disclaimer, the term of this patent is extended or adjusted under 35 U.S.C. 154(b) by 283 days.

(21) Appl. No.: 15/746,710

(22) PCT Filed: Jul. 22, 2016

(86) PCT No.: PCT/FR2016/051919
§ 371 (c)(1),
(2) Date: Jan. 22, 2018

(87) PCT Pub. No.: WO2017/017362
PCT Pub. Date: Feb. 2, 2017

(65) Prior Publication Data
US 2018/0209485 A1 Jul. 26, 2018

(30) Foreign Application Priority Data
Jul. 27, 2015 (FR) .................................... 15 57120

(51) Int. Cl.
*F16D 3/84* (2006.01)
*F16D 3/223* (2011.01)
*F16D 3/227* (2006.01)

(52) U.S. Cl.
CPC ............. *F16D 3/845* (2013.01); *F16D 3/223* (2013.01); *F16D 3/227* (2013.01);
(Continued)

(58) Field of Classification Search
CPC .......... F16D 3/845; F16D 3/223; F16D 3/227; F16D 2300/26; F16D 2003/22316; Y10S 464/906
(Continued)

(56) References Cited

U.S. PATENT DOCUMENTS 5,419,741 A * 5/1995 Schwarzler .......... B22D 11/168
277/636
5,765,837 A 6/1998 Schwarzler
(Continued)

FOREIGN PATENT DOCUMENTS

GB 2 086 534 A * 5/1982 .................... 464/175

OTHER PUBLICATIONS

International search report dated Nov. 7, 2016.

*Primary Examiner* — Greg Binda
(74) *Attorney, Agent, or Firm* — IPSILON USA, LLP

(57) ABSTRACT

A dust boot (2) for an articulated transmission joint has a tulip (6) presenting an open end (62) and an opposite end designed to be secured to a first shaft (8), a second shaft (10), and rolling bearing means (3) mounted on an end (13) of the second shaft (10). The bearing means (3) has rolling elements (34) housed in a cage (32). The dust boot (2) includes a groove (24) suitable for receiving at least some of the rolling elements during an inclined movement of the second shaft (10) towards an outlet of the tulip, and a shoulder (22) separated from the groove (24) by a peripheral wall (25) that co-operates with the shoulder (22) to define a housing suitable for receiving a portion of the cage (32) of the bearing means (3) when the cage (32) is in abutment against the shoulder (22).

10 Claims, 3 Drawing Sheets

(52) U.S. Cl.
    CPC .............. *F16D 2003/22316* (2013.01); *F16D 2300/26* (2013.01); *Y10S 464/906* (2013.01)
(58) Field of Classification Search
    USPC .......................................... 464/175; 277/636
    See application file for complete search history.

(56) References Cited

U.S. PATENT DOCUMENTS

| | | |
|---|---|---|
| 5,879,238 A | 3/1999 | Breheret |
| 2010/0120546 A1 | 5/2010 | Suzuki |
| 2013/0072312 A1* | 3/2013 | Wormsbaecher ........ F16D 3/223 |
| 2018/0363712 A1* | 12/2018 | Clemm ................... F16D 3/229 |

* cited by examiner

United States Patent US 10,830,283 B2

DUST BOOT FOR TRANSMISSION JOINT AND CORRESPONDING TRANSMISSION ASSEMBLY

RELATED APPLICATION

This application is a National Phase of PCT/FR2016/051919, filed on Jul. 22, 2016 which in turn claims the benefit of priority from French Patent Application No. FR 15 57120, filed on Jul. 27, 2015, the entirety of which are incorporated by reference.

FIELD OF THE INVENTION

In general, the present invention relates to dust boots for transmission joints, as well as to corresponding transmission assemblies.

PRIOR ART

The invention relates more particularly to a dust boot for an articulated transmission joint, said articulated transmission joint comprising a casing, referred to as a "tulip", that presents an open end, an opposite end designed to be secured to a first shaft, a second shaft, and rolling bearing means mounted on an end of the second shaft. Said bearing means comprise rolling elements housed in a cage and said end of the second shaft is housed with the bearing means inside the tulip. Said dust boot presents two open ends, one of which is designed to be mounted on the open end of the tulip.

Such a dust boot (or "bellows") is known in the prior art and in particular from the patent document published under number EP 0 791 150. In said document EP 0 791 150, the first shaft is an input shaft, the second shaft is an output shaft, and said rolling bearing means are ball-bearing means.

The dust boot described in document EP 0 791 150 presents a radially inner peripheral web that extends facing the bearing means.

Thus, when the transmission assembly is handled, in particular in order to mount it in a motor vehicle or to remove it, any potential axial movement of the output shaft towards an outlet of the tulip is stopped by the balls of said bearing means coming into abutment against said radially inner peripheral web of the dust boot.

However, the output shaft may still exit the tulip when the output shaft is handled and moved in a direction that is inclined relative to the axis of the opening of the tulip.

An object of the present invention is to propose a novel dust boot and a corresponding novel transmission assembly making it possible to overcome some or all of the above-described problems.

SUMMARY OF THE INVENTION

To this end, the invention provides a dust boot for an articulated transmission joint. The articulated transmission joint has a casing, referred to as a "tulip", that presents an open end, and an opposite end designed to be secured to a first shaft. A second shaft and rolling bearing means is mounted on an end of the second shaft. The bearing means has rolling elements housed in a cage, and the end of the second shaft being housed with the bearing means inside the tulip. The dust boot presents two open ends, one of which is designed to be mounted on the open end of the tulip.

The dust boot has a radially inner peripheral groove, referred to as a stop groove, forming a seat suitable for receiving at least some of the rolling elements of the bearing means during an inclined movement, preferably lying in the range of 0° to 18°, of the second shaft relative to the axis of the opening of the tulip, towards an outlet of the tulip.

A radially inner shoulder, referred to as a cage stop shoulder, forms an abutment suitable for retaining the cage of the bearing means during the movement of the second shaft. The shoulder is separated from the groove by a peripheral wall that co-operates with the shoulder to define a housing suitable for receiving a portion of the cage of the bearing means when the cage is in abutment against the shoulder.

By means of such a dust boot design, said dust boot opposes disengagement of the transmission shaft relative to the tulip, not only when the shaft is subjected to an axial movement, but also when the shaft is moved while inclined relative to the axis of the tulip.

In a particular aspect, said dust boot thus holds the shaft via the cage and the rolling elements whatever the angle of inclination of the axis of the second shaft lying in the range [0°, 18°], and preferably whatever the angle of inclination lying in the range [0°, 30°], relative to the axis of the opening of the tulip.

Indeed, when the shaft provided with the bearing means is inclined and it moves towards an outlet of the tulip, the cage of the bearing means comes into abutment against the radially inner shoulder in combined manner with at least some of the rolling elements that come into abutment in the radially inner groove.

Thus, the force exerted on the shaft during handling is taken up not only at the groove on a portion of the outside surfaces of at least some of the rolling elements contacting the contact surface of the groove, but also at the shoulder by the cage contacting the shoulder.

When the shaft nested in the tulip is moved towards an outlet of the tulip, and in particular when said shaft is inclined relative to the axis of the opening of the tulip, such a dust boot design makes it possible to distribute the force to which the shaft is subjected over the groove and the shoulder of the dust boot.

According to an advantageous characteristic of the invention, the cage stop shoulder is closer to the axis of the dust boot than is the stop groove.

In other words, the radius taken between the axis of the dust boot and the tip of the stop groove that is the closest to the axis of the dust boot is greater than the radius taken between the axis of the dust boot and the tip of the shoulder that is the closest to the axis of the dust boot.

According to an advantageous characteristic of the invention, the shoulder is formed by an inner peripheral wall that is substantially radial.

Thus, the shoulder forms a wall that extends generally orthogonally to the axis of the dust boot, in such a manner as to form a hard abutment stop for the cage of the bearing means.

According to an advantageous characteristic of the invention, the stop groove presents a concave profile, of concavity that is oriented towards the axis and the mouth at the end of the dust boot designed to cover the tulip.

Said profile is taken in a section view of the dust boot on an axial plane. The profile of the stop groove may also be defined as the generator line of said groove.

Advantageously, said profile of the groove is circularly arcuate, preferably over one fourth of a circle.

According to an advantageous characteristic of the invention, said peripheral wall that separates the shoulder from the groove extends in a direction that is mainly parallel to the axis of the dust boot.

According to an advantageous characteristic of the invention, the shoulder is formed by molding the groove together with the end of the dust boot designed to be fastened on the tulip.

By means of such a design, the thickness of the stop groove and of the stop shoulder may be controlled and adapted accurately in order to confer stiffness thereto that is sufficient and greater than the stiffness of the folds of the dust boot.

According to an advantageous characteristic of the invention, in axial section of the dust boot, the tip of the shoulder that is the closest to the axis of the dust boot, referred to as the bottom tip of the shoulder, is situated substantially in alignment with the tips formed by the base of each corrugation of the dust boot, the tip of the stop groove that is the closest to the axis of the dust boot being spaced apart from said alignment.

According to an advantageous characteristic of the invention, the groove is formed by the apex lines of webs made on the inner periphery of the dust boot and spaced apart circumferentially from one another.

The invention also relates to a transmission assembly, in particular for a motor vehicle transmission, that comprises:

a casing, referred to as a "tulip", that presents an open end, and an opposite end designed to be secured to a first shaft; and a second shaft and rolling bearing means mounted on an end of the second shaft, said bearing means comprising rolling elements housed in a cage, and said end of the second shaft being housed with the bearing means inside the tulip;

said transmission assembly also comprising a dust boot through which the second shaft passes, and having an end mounted on the open end of the tulip, the assembly being characterized in that said dust boot is as described above.

BRIEF DESCRIPTION OF THE DRAWINGS

Other characteristics and advantages of the invention can be seen better on reading the following description, which is purely illustrative and non-limiting and should be read with reference to the accompanying drawings, in which.

DETAILED DESCRIPTION

Figure 1:
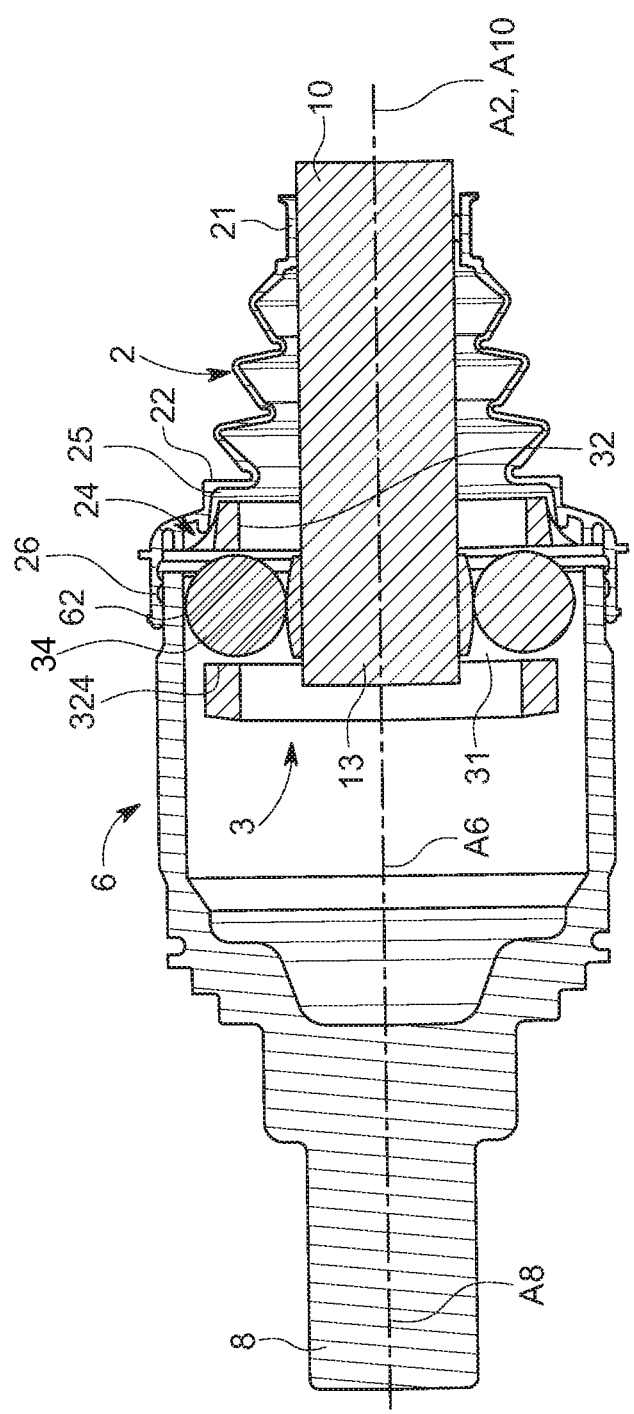
FIG. 1 is a longitudinal section view of a transmission assembly comprising a first shaft fastened to a tulip and a second shaft having an end that is coupled to the inside of the tulip by means of rolling bearing means, a dust boot being mounted on the second shaft and on the tulip, in accordance with an embodiment of the invention.
Figure 2:
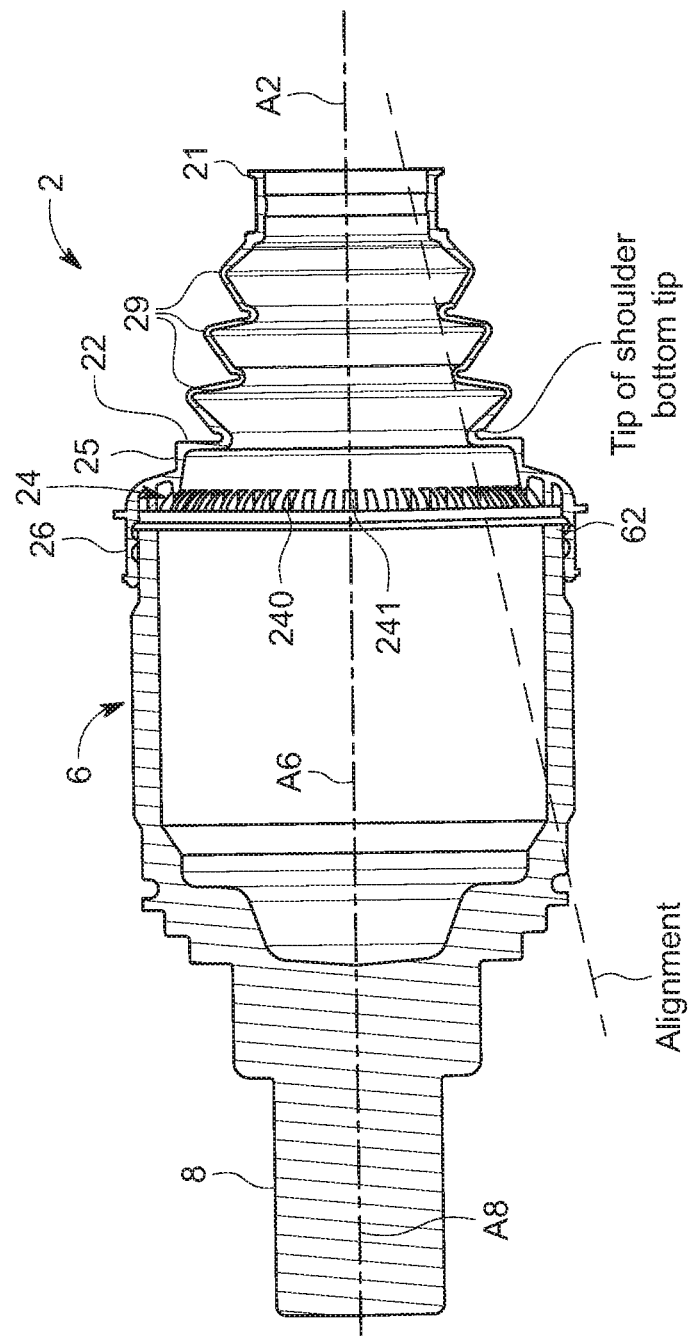
FIG. 2 is a view of FIG. 1 in which the second shaft and the corresponding bearing means are not shown in order to show better the stop groove and the cage stop shoulder of the dust boot.
Figure 3:
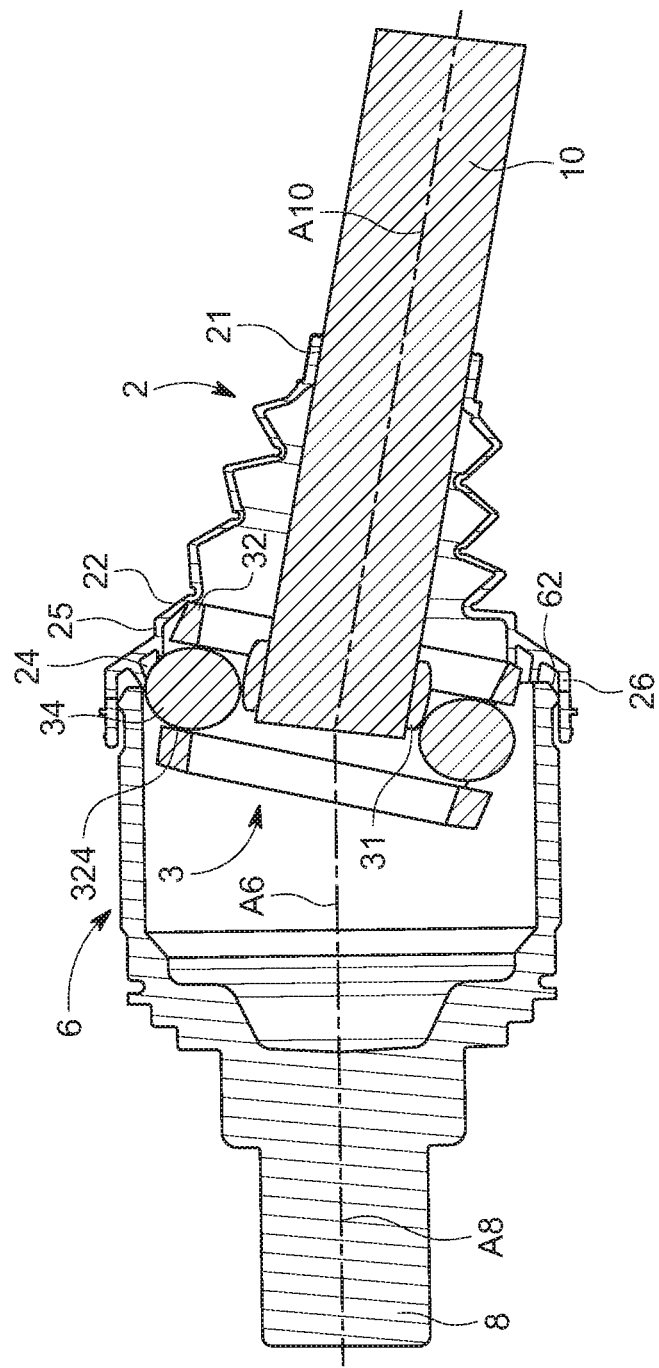
FIG. 3 is a longitudinal section view of the transmission assembly of FIG. 1, with the second shaft in its state moved towards an outlet of the tulip, while inclined relative to the axis of the tulip.

The concept of the invention is described more completely below with reference to the accompanying drawings, in which embodiments of the concept of the invention are shown. In the drawings, the sizes and the relative sizes of elements of the transmission assembly may be exaggerated for reasons of clarity.

Similar numbers make reference to similar elements in all of the drawings. However, this concept of the invention may be implemented in numerous different forms and should not be interpreted as being limited to the embodiments described herein. Instead of that, these embodiments are proposed so that the description is complete, and they communicate the scope of the concept of the invention to the person skilled in the art. Consequently, the scope of the invention is defined by the accompanying claims.

For reasons of simplification, the embodiments below are examined in relation to the terminology and structure of a transmission assembly for a motor vehicle.

A reference in any part of the description to "an embodiment" indicates that a particular function, structure, or characteristic described with reference to an embodiment is included in at least one embodiment of the present invention. Thus, the appearance of the expression "in an embodiment" in various places throughout the description does not necessarily refer to the same embodiment. Furthermore, the particular functions, structures, or characteristics may be combined in any appropriate manner in one or more embodiments.

FIG. 1 is a diagram showing an articulated joint of a transmission assembly, preferably for a motor vehicle, in an embodiment. The joint comprises a casing in the form of a tulip 6 that is connected to an input shaft 8 so that the casing 6 rotates with the input shaft 8.

The tulip 6 presents an open end 62 that defines a mouth of axis A6. The input shaft 8 presents an axis A8 that is parallel, preferably coinciding with the axis A6 of the tulip 6.

The joint also comprises an output shaft 10 connected by way of example to one of the drive wheels of the vehicle. The shaft 10 is rigid and presents an end 13 fitted with rolling bearing means 3. Said end 13 of the second shaft 10 is housed with the bearing means 3 in the tulip 6 so that the bearing means 3 enable the tulip 6 and the second shaft 10 to be articulated, and also enable the output shaft 10 to be driven in rotation by the input shaft 8.

Said bearing means 3 comprise an annular element 31, referred to as a core, fastened on the end of the output shaft 10 engaged in the tulip.

The core 31 supports a plurality of rolling elements 34 each of which is engaged in a raceway (not shown) made in the outside surface of the core. In the embodiment shown in the figures, said rolling elements 34 are balls.

The rolling elements can also be engaged at their outer portions, i.e. their portions oriented towards the tulip, in a radial raceway (not shown) made in the inner surface of the tulip.

Furthermore, the rolling elements 34 are housed in a cage 32 that makes it possible to keep the rolling elements spaced apart from one another. The cage 32 is present in the form of an annular body that extends around and spaced apart from the core 31. The annular body presents openings 324 that are distributed circumferentially and through which the rolling elements extend in order to enable the rolling elements to come into contact with the core 31 and into contact with the inside of the tulip 6.

Consequently, when the tulip 6 is rotated by the input shaft 8, this rotation is transmitted to the output shaft 10 by means of the rolling elements 34.

In known manner, provision of rolling elements 34 makes angular movement possible between the axis A10 of the output shaft 10 and the axis A8 of the input shaft 8, thus accommodating a corresponding movement of the wheel.

In order to protect the mechanism of the joint from the effects of moisture and of dust and of any other 10 contamination, a dust boot 2 is provided. This dust boot 2 is advantageously manufactured by molding and by blow-forming using a thermoplastic material as described below.

The dust boot 2 is present in the form of an elongate hollow body suitable for having the shaft 10 pass through it. Said hollow body has one end 26 that can be positioned to cover the open end 62 of the tulip 6, and an opposite end that can be secured to said shaft 10. Advantageously, the dust boot is made of synthetic material. In the embodiment shown in the figures, the end 26 of the dust boot 2 is of diameter that is greater than the diameter of the opposite end 21.

The dust boot comprises a plurality of individual corrugations 29 that extend preferably as a single part between the two ends 26, 21 of the dust boot 2. Advantageously, the end of the dust boot 26 is fastened on the corresponding end 62 of the tulip 6 by means of a clamp collar.

In one particular aspect, the end 21 of the dust boot is clamped around the shaft 10 by a clamp collar. In addition to the angular movement permitted by the joint, provision is made for the shaft 10 to move a little in limited manner in a direction that is axial relative to the tulip 6.

In particular, the tulip 6 includes axial raceways (not shown) distributed over the inner peripheral surface of the tulip, and, as mentioned above, a radial raceway (not shown) situated on the inner peripheral surface of the tulip in the proximity of the open end of the tulip.

Between its ends 26, 21 and beside the end 26 of the dust boot 2 that covers the tulip 6, said dust boot 2 includes a radially inner peripheral groove, referred to as the stop groove 24, and a radially inner shoulder, referred to as the cage stop shoulder 22.

The stop groove 24 extends over the inner periphery of the dust boot. The stop groove 24 forms an abutment relative to at least some of the rolling elements 34 of said bearing means 3 during a movement of the second shaft 10 towards an outlet of the tulip 6 through the opening 62 and in a direction that is inclined relative to the axis A6 of the opening of the tulip 6. Said inclined direction is a direction that forms an angle with the axis A6 of the tulip, or with the axis A8 of the shaft 8, which angle lies in the range]0°; 18°], or even lies in the range]0°; 30°].

The cage stop shoulder 22 is axially spaced apart from the stop groove 24 towards the end 21 of the dust boot. In other words, the shoulder 22 of the cage stop extends between the groove 24 and the corrugations 29 of the dust boot. The cage stop shoulder 22 forms an abutment relative to the cage 32 of the bearing means 3.

The cage stop shoulder 22 is closer to the axis A2 of the dust boot 2 than is the stop groove 24.

Furthermore, in axial section of the dust boot, the tip of the shoulder 22 that is the closest to the axis of the dust boot, referred to as the bottom tip of the shoulder, is situated substantially in alignment with the tips formed by the base of each corrugation 29 of the dust boot. The tip of the stop groove 24 that is the closest to the axis of the dust boot is spaced apart from said alignment. Furthermore, the spacing from said alignment is in the direction spacing it away from the axis of the dust boot. The tip of the stop groove 24 that is the closest to the axis A2 of the dust boot 2 forms the point of connection between the groove 24 and the axial peripheral wall 25.

In the axially aligned state of the tulip 6, the dust boot 2, and the shaft 10, the bottom tip of the shoulder 22 is closer to said axes A2, A6, A10 than is the inner surface of the annular cage 32.

The portions 22, 24, 25 of the dust boot are rigid, relative to the corrugations, and extend as a single part. In particular, the shoulder 22 is formed by molding the groove 24 with the end 26 of the dust boot designed to be fastened on the tulip. The peripheral wall 25 is also formed by molding with the portions 22, 24, 26.

The portion of the dust boot 2 lying between the shoulder 22 and the end 21 of the dust boot mounted on the shaft 10 is obtained by blow-forming.

The portions 22, 24, 25 of the dust boot thus form an inner peripheral barrier facing the open mouth of the tulip 6, which acts in positive manner to prevent the rolling elements 34 and the cage 32 from being disengaged from the mouth during movement of the shaft 10 in a direction that is inclined relative to the axis A6 of the tulip 6.

In the embodiment shown in the figures, the groove 24 is formed by the apex lines of webs 240 made on the inner periphery of the dust boot and spaced apart circumferentially from one another.

In other words, the face of the groove that makes contact with the rolling elements presents gaps 241 that make it possible to reduce the weight of the dust boot and to promote ventilation between the rolling elements 34 and the groove 24 when they come into contact.

The spacing between the webs 240 is smaller than the diameter or than the section and the size of the rolling elements 34. Provision may be made for the webs 240 to be reinforced by a wall extending radially and circumferentially, i.e. transversely to the webs 240.

The invention claimed is:

1. A dust boot for an articulated transmission joint, said articulated transmission joint having
   a tulip, that presents an open end, and an opposite end designed to be secured to a first shaft; and
   a second shaft and rolling bearing means mounted on an end of the second shaft, said bearing means comprising rolling elements housed in a cage, and said end of the second shaft being housed with the bearing means inside the tulip;
   said dust boot comprising:
   two open ends, one of which is designed to be mounted on the open end of the tulip; wherein said dust boot comprises:
   a radially inner peripheral groove, referred to as a stop groove, forming a seat suitable for receiving at least some of the rolling elements of said bearing means during an inclined movement, lying in the range [0°, 18°], of the second shaft relative to the axis of the opening of the tulip, towards an outlet of the tulip; and
   a radially inner shoulder, referred to as a cage stop shoulder, forming an abutment suitable for retaining the cage of the bearing means during said movement of the second shaft, said shoulder being separated from the groove by a peripheral wall that co-operates with the shoulder to define a housing suitable for receiving a portion of the cage of the bearing means when said cage is in abutment against the shoulder.

2. The dust boot according to claim 1, wherein the cage stop shoulder is closer to the axis of the dust boot than is the stop groove.

3. The dust boot according to claim 1, wherein the shoulder is formed by an inner peripheral wall that is substantially radial.

4. The dust boot according to claim 1, wherein the stop groove presents a concave profile, of concavity that is oriented towards the axis and the mouth at the end of the dust boot designed to cover the tulip.

5. The dust boot according to claim 1, wherein the stop groove presents a circularly arcuate profile over one fourth of a circle.

6. The dust boot according to claim 1, wherein said peripheral wall that separates the shoulder from the groove extends in a direction that is mainly parallel to the axis of the dust boot.

7. The dust boot according to claim 1, wherein the shoulder is formed by molding the groove together with the end of the dust boot designed to be mounted on the tulip.

8. The dust boot according to claim 1, wherein in axial section of the dust boot, the tip of the shoulder that is the closest to the axis of the dust boot, referred to as the bottom tip of the shoulder, is situated substantially in alignment with the tips formed by the base of each corrugation of the dust boot, the tip of the stop groove that is the closest to the axis of the dust boot being spaced apart from said alignment.

9. The dust boot according to claim 1, wherein the groove is formed by the apex lines of webs made on the inner periphery of the dust boot and spaced apart circumferentially from one another.

10. A transmission assembly, in particular for a motor vehicle transmission, that comprises:
   a tulip, that presents an open end, and an opposite end designed to be secured to a first shaft; and
   a second shaft and rolling bearing means mounted on an end of the second shaft, said bearing means comprising rolling elements housed in a cage, and said end of the second shaft being housed with the bearing means inside the tulip;
   said transmission assembly also comprising a dust boot through which the second shaft passes, and having an end mounted on the open end of the tulip, the assembly being wherein said dust boot is according to claim 1.

* * * * *